United States Patent Office 3,247,284
Patented Apr. 19, 1966

3,247,284
COMPOSITIONS COMPRISING EPOXIDIZED POLY-
BUTADIENE, POLYCARBOXYLIC ANHYDRIDE,
POLYHYDRIC ALCOHOL AND A VINYL ARO-
MATIC MONOMER
Charles A. Heiberger, Gene Nowlin, and Murray H.
Reich, Princeton, N.J., assignors to FMC Corporation,
a corporation of Delaware
No Drawing. Filed Jan. 14, 1960. Ser. No. 2,342
18 Claims. (Cl. 260—836)

This invention relates to novel resin compositions, and particularly to novel products obtained by the reaction of epoxidized diene polymers with new and improved curing systems.

It is well known that various polymeric structures containing epoxy groups, wherein an oxygen atom bridges adjacent carbon atoms, may be cured by reacting these polymers through their epoxy groups, with polyfunctional curing agents, to form cross-linked polymeric products of very high molecular weight. It is also known that polymers and copolymers of butadiene and other dienes may be epoxidized, and the curing of these epoxidized dienes to form high molecular weight products has been the subject of much recent investigation.

An apparently general characteristic of epoxidized polymers, even those of relatively low molecular weight and low epoxy content, is their very high viscosity. Liquid polymers of butadiene, for example, become viscous oils or waxy solids on epoxidation, so that when it is desired to cure such resins by reacting with polyfunctional curing agents, it is difficult to obtain adequate mixing between the viscous or waxy epoxypolybutadiene and the curing agent, or to obtain adequate flow into molds or laminates. Reduction in viscosity of the epoxy polymer during formulation and use may of course be achieved by heating, but the accompanying reduction in the pot life of the composition is often disadvantageous. It has been suggested that solvents be used to dilute epoxy polymers, but this technique is of course inapplicable for such end uses as encapsulating or molding. Heretofore, many of the advantages inherent in the use of high molecular weight or high epoxy content polymers have been lost due to difficulties in handling such viscous or solid epoxy polymers, or in finding curing formulations which would lower the viscosity without diminishing the favorable physical properties of the cured product.

It has now been discovered that thermosetting epoxy-polybutadiene compositions having a substantially lower viscosity in the uncured state than that of the epoxy polymer itself, yet which preserve and actually enhance the physical properties of the cured polymer, are obtained by formulating and curing epoxypolybutadiene with the novel curing compositions of this invention. These curing compositions consist in the combination of an unsaturated dicarboxylic anhydride having a polymerizable double bond, and aliphatic polyhydric alcohol, a free radical initiating agent, and a compound of the formula

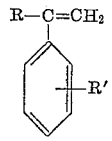

where R and R' may each be hydrogen or methyl, typical examples being styrene, alpha-methylstyrene and vinyltoluene. These vinylbenzenes serve to reduce the viscosity of uncured epoxypolybutadiene compositions, but surprisingly do not reduce the pot life of the system. In fact, when the unsaturated anhydride component of the curing system is maleic anhydride, which is known to copolymerize readily and rapidly with styrene, the pot life of these components is actually prolonged in the epoxypolybutadiene system described herein.

Not only is the viscosity reduced and the pot life prolonged for the uncured compositions, but epoxypolybutadienes cured with the curing system of this invention are characterized by unusual thermal stability, enhanced resistance to the prolonged action of boiling water, rapid rates of cure at elevated temperatures, clarity and other improved properties. The utility of epoxypolybutadienes is thus substantially extended: for example, in laminates and potting compounds their excellent flow and wetting characteristics at room temperature provide both ease of handling and further stability to premature curing, whereas heretofore it was necessary to heat epoxypolybutadiene compositions to obtain adequate mixing and flow.

As an additional advantage of the curing compositions of this invention, higher molecular weight epoxypolybutadienes may be used as the base resin, due to the lowering of their viscosity to a useful range by the presence of styrene and styrene homologs. There are advantages inherent in the use of higher molecular weight polymers, not only in that the range of polymers which may be used is substantially broadened, but also that higher flexural strengths and better chemical resistance are obtained from higher molecular weight base resins.

The base resin for the instant composition is a liquid polymer or copolymer of butadiene which has been epoxidized. The polybutadiene itself may be prepared by any of a number of well known methods, such as emulsion or solution polymerization using a wide variety of catalysts, including free radical, alkali metal, Friedel-Crafts and organo-metallic catalysts. Although heretofore satisfactory products generally required the use of liquid polymers having a molecular weight below about 2500, corresponding to a viscosity below about 50 poises measured at zero shear and 25° C., higher polymers may be used effectively in the instant invention, having molecular weights up to about 10,000 and viscosities of 100 poises and higher. When epoxidized to a low epoxy content, even higher molecular weight polymers are conveniently used, and at epoxy contents of 1–2%, polybutadienes and copolymers having a molecular weight as high as 20,000 may be used. The lower limit of the molecular weight range for these polymers is about 100; that is, mixtures with dimers and trimers could actually be employed, should they be desired to impart particular properties for special applications. In general, a convenient and preferred molecular weight range for the polybutadienes and copolymers is in the range of about 250 to 10,000. Useful techniques for the polymerization and copolymerization of butadiene to form liquid and solid polymers are described in U.S. Patents 2,631,175 and 2,791,618.

For the epoxidation of the polybutadienes and copolymers thereof, standard epoxidation techniques may be used. Aliphatic, aromatic, and inorganic peracids, salts of the peracids, peroxides and hydroperoxides are the most common of the effective epoxidizing agents. For convenience, lower aliphatic peracids, such as performic, peracetic, perpropionic and perbutyric are preferred reagents. With these reagents, the epoxidation reaction may be carried out using a preformed peracid, or the peracid may be formed in the reaction medium, generally by adding hydrogen peroxide to an aliphatic acid or anhydride medium. Peracids may be prepared in any known way, such as is described in "Organic Syntheses," coll. volume I, second edition, John Wiley & Sons (1941), page 431. A number of epoxidation techniques for polybutadiene are illustrated in an article by C. W. Wheelock in Industrial and Engineering Chemistry 50, 299–304 (1958).

The epoxidation may be conducted using stoichiometric amounts of the peracid; that is, one mole of hydrogen peroxide or peracid per double bond in the polymer; or amounts below that the theoretically required may be used. There is no significant advantage to using excess oxidant and, although the reactivity and properties of the epoxidized polybutadienes do vary with the degree of epoxidation, it has been found that the use of as little as 5% of the theoretical amount of peracid will produce useful resins. In general, the epoxidized polybutadienes used herein contain at least 1% by weight of epoxy oxygen, and it is preferred for most applications to employ epoxypolybutadienes having about 4 to 10% epoxy oxygen by weight. Epoxypolybutadienes containing more than 10% epoxy oxygen may also be used, since their very high viscosity is reduced to a useful range by the vinylbenzene component of the curing system. A practical epoxidation limit for epoxypolybutadiene is about 15% by weight of epoxy oxygen. Should it be necessary or convenient to add a solvent to facilitate completion of the epoxidation reaction by reducing the viscosity of a particular resin during expoxidation, suitable solvents including such common organics as heptane, benzene and chloroform, the solvent may be removed before or after the addition of the vinylbenzene-type monomer.

As stated above, the curing formulation used herein consists of an unsaturated dicarboxylic anhydride having a polymerizable double bond, an aliphatic polyhydric alcohol, a free radical initiating agent, and a vinylbenzene monomer. By appropriate selection of the particular component of each class, compositions having an extremely broad range of useful properties are obtained.

As the anhydride component of the curing agent, a wide variety of unsaturated polycarboxylic anhydrides containing reactive double bonds are effective in this system, used alone or in combination with each other or with saturated anhydrides. Typical reactive unsaturated anhydrides include maleic anhydride, monosubstituted maleic anhydrides such as chloromaleic and citraconic; itaconic, bicyclo - (2,2,1) - heptene-2,3-dicarboxylic, bicyclo - (2,2,1) - 5-methyl-5-heptene-2,3-dicarboxylic anhydride; and many other unsaturated anhydrides having reactive double bonds, of varied structure and properties.

Excellent results are readily and economically obtained with maleic anhydride, used either alone or in combination with other aliphatic, alicyclic and aromatic polycarboxylic anhydrides, to prepare compositions having specific curing characteristics and cured properties. For example, compositions may be prepared where as much as 95% of the anhydride component consists of a saturated anhydride, or an anhydride containing relatively unreactive double bonds, since the presence of even 5% of reactive double bonds in the anhydride contributes to the improved properties of the product. Typical anhydrides in combination include succinic, dodecenylsuccinic, octenylsuccinic, di- and tetrachlorophthalic, tetrahydrophthalic, hexahydrophthalic, dichloromaleic, pyromellitic, bicyclo-(2,2,1)-heptene-1,4,5,6,7,7-hexachlor-2,3-dicarboxylic anhydride, and many others.

The aliphatic polyhydric alcohol component of the curing system may be a dihydric alcohol, illustrated by the glycols and glycol ethers such as ethylene glycol, propylene glycol, triethylene glycol, dipropylene glycol, 1,4-butanediol, 2,3-butanediol, 1,6-hexanediol, 1,2-octanediol, cyclopentanediols, cyclohexanediols and long chain diols of straight and branched chains, which chains may contain aromatic rings, such as xylylene glycol and dimethylxylylene glycol. Higher polyols such as glycerol, 3-methylolpentane - 1,5 - diol, tetrahydroxybutane, pentaerythritol, polypentaerythritol, polyallyl alcohol, dextrose, sorbitol, mannitol and trimethylolbenzene may also be used, as well as a large number of other dihydroxy and polyhydroxy compounds, used alone or as mixtures. Unsaturated polyols, such as 2-butene-1,4,-diol, dihydroxycyclopentene and tetrahydroxycyclohexene may also be used. Substituents such as halogen, nitro, amino or other functional groups may be incorporated to impart particular properties to the product.

For best results, the amount of anhydride used should be at least equivalent to the amount of aliphatic polyol used. By equivalent amount is meant equivalent number of reactive groups; thus a simple anhydride contains two reactive groups, and a glycol contains two reactive groups. It is usually preferred to use excess anhydride equivalents over polyol equivalents for best results. When equivalent amounts of anhydride and polyol are used the rate of cure is lower, but may be accelerated with an acid catalyst. When excess polyol is used, a reasonable rate of cure may still be obtained by using an acid catalyst, but the properties of the products are in general inferior. With lower aliphatic glycols and aliphatic dicarboxylic anhydrides, it has been found that best results are generally obtained in the range of about 3 to 4 equivalents of anhydride per equivalent of glycol, although good results have also been obtained using a large excess of anhydride, and even at 9 or 10 excess anhydride equivalents improved products have resulted, at a very rapid reaction rate.

The total amount of combined anhydride plus polyol required for optimum properties in the cured epoxypolybutadiene composition depends both on the degree of epoxidation of the epoxypolybutadiene and on the particular curing combination used. In general, one epoxide equivalent of epoxypolybutadiene, that is, the amount of epoxypolybutadiene containing one atom of epoxy oxygen, requires a total amount of anhydride plus polyol containing at least one equivalent of reactive groups. As previously defined, a simple anhydride and a simple glycol each contains two reactive groups, and thus each contains two equivalents of reactive groups—a simple anhydride plus a simple glycol, combined, contain a total of four reactive groups. As the amount of total anhydride plus polyol used in the curing system is increased, the flexural strength, tensile strength, heat stability and other properties of the cured product are improved. Excellent results are obtained when a total of about 1.25 to 2.5 equivalents of total reactive groups in the polyol and anhydride are used per atom of epoxy oxygen in the epoxypolybutadiene, and useful products are obtained in the range of about 0.5 to over 4 equivalents of reactive groups in the curing agent per atom of epoxy oxygen.

The third essential component of the curing system is a vinylbenzene, such as styrene, alpha-methylstyrene and vinyl-toluene. These vinyl monomers dissolve in epoxypolybutadiene, lowering the viscosity and facilitating mixing with the other components of the curing system. Without intending to be limited to any particular curing mechanism, it may be suggested that the vinylbenzene monomer copolymerizes with the unsaturated anhydride, and that this copolymerization is accompanied by interaction with the residual double bonds in the epoxypolybutadiene to form a terpolymer based on vinyl-type polymerization, which polymerization occurs concurrently with condensation interaction among the anhydride, polyol and epoxy groups which are also present. Thus the amount of vinylbenzene or homolog which is employed in the curing formulation depends somewhat on the degree of residual unsaturation in the particular polybutadiene base resin, and on the specific polymerization characteristics of the unsaturated anhydride used. In general, about 5 to 50 parts of vinyl monomer per 100 parts of epoxypolybutadiene may be used, with best results generally obtained in the range of 20 to 40 parts vinyl monomer per 100 parts epoxypolybutadiene. Small amounts of other monomers may also be included in the formulation, and additional cross-linking may be provided through the use of difunctional vinyl monomers such as divinyl benzene.

Monomers of the styrene type as normally provided in commerce contain small amounts of an inhibitor, such as hydroquinone, to provide stability during shipping and storage. It has been discovered that the presence of added amounts of an inhibitor such as hydroquinone provides an additional benefit, in that clarity is imparted to castings cured at low temperatures which might otherwise be hazy or opaque. Beneficial results are observed when a total of 0.02 to about 0.5 part hydroquinone per 100 parts epoxypolybutadiene are present in the system during formulation of the curing composition.

The fourth component of the curing formulation is a free radical initiating agent. This may be any agent which is stable below the curing temperature, but which liberates free radicals into the system under the curing conditions. The free radical initiators are those normally used in the catalysis of free radical polymerization reactions, most commonly peroxygen compounds, such as aliphatic, aromatic and inorganic peracids, salts and esters of the peracids, peroxides and hydroperoxides, but also including other types of free radical initiators such as 2,2'-azo-bisisobutyronitrile. It is preferred herein to use organic peroxy compounds which are compatible with and soluble in the other components of the curing system. Examples of such peroxides include t-butyl perbenzoate, benzoyl peroxide, dicumyl peroxide, 2,5-bis(tert.-butylperoxy) - 2,5 - dimethylhexane, methyl ethyl ketone peroxide, di-t-butyl diperphthalate, di-t-butyl peroxide, p-menthane hydroperoxide, acetyl peroxide, pinane hydroperoxide, 2,5-dimethylhexane - 2,5-dihydroperoxide, cumene hydroperoxide, cyclohexanone peroxide, and many others. Peroxidated polybutadiene or epoxypolybutadiene may also be used as the catalyst.

The decomposition temperatures of the free radical initiator may be in the broad range of about 25 to 200° C., since the curing system may be so formulated as to be reactive throughout this range. Although room temperature cure may be achieved, and sometimes is preferred, most of the peroxides listed above are active in the range of 75°–175° C., since this is a convenient temperature range for obtaining completely cured products within a reasonable time. If curing is to be effected in two or more stages by progressively increasing the temperature, a combination of two or more appropriately selected free radical initiators may be used. The amount of free radical initiator used may vary over a wide range, and from 0.01 to 5% of peroxide, by weight of total curing agent (polyol, anhydride and vinyl monomer), may be used. In general, excellent results are obtained in a preferred range of about 0.2 to 2% of peroxide. The decomposition of the peroxide may be promoted by the use of various well-known additives such as acids or amines, of which typical examples are phosphoric acid, cobalt naphthenate, dimethyl aniline and boron trifluoride. The decomposition of the peroxide is, in fact, promoted during the curing reaction by acid formed during the reaction.

The components of the composition of this invention may be combined in any convenient way. Any two or more may be premixed prior to blending into the resin which itself may contain one or more of the cure agents. Alternately one or more of the cure agents may be blended with the resin prior to addition of the remaining prescribed cure agents.

It is preferred to combine the epoxypolybutadiene with the vinylbenzene monomer first, before addition of the other components of the curing system, due to the substantial reduction in viscosity imparted by the monomer. It is then possible to add even a high melting anhydride or polyol to the resin system, and to obtain homogeneous solutions without significantly raising the mixing temperature or shortening the pot life.

In alternative procedures, the anhydride may be added first to the base resin, followed by addition of the other components. However, since anhydrides alone react rapidly with epoxypolybutadienes, additional precautions are necessary, such as careful temperature control. As another alternative, the polyol and anhydride may be premixed before addition to the base resin containing the vinyl monomer. This procedure has been found substantially to increase the rate of cure of the resin. Thus, if room temperature cure is desired, or a high rate of cure at elevated temperatures, this procedure is followed. Premixing is most conveniently accomplished at the temperature at which both polyol and anhydride are liquid. Temperatures higher than necessary to obtain this liquid state should be avoided, and the peroxide catalyst and the vinyl monomer should not be present during this premixing, to avoid premature interaction.

Mixing of the components should of course be carried out at a temperature below the decomposition point of the peroxide, or below the temperature at which the curing reaction is thermally initiated. In other words, the peroxide used in the curing formulation should be so selected that it does not decompose at the temperatures at which it is desired to prepare and, if necessary, store the composition before curing. An inhibitor may be used to prevent premature thermal or photochemical initiation of the polymerization.

The curing reaction is preferably carried out at low to moderate temperatures, to facilitate control of the reaction rate, which increases with increased temperature. A useful procedure is to allow the composition to stand for a brief period at temperatures between about 0° C. and 75° C., and then to raise the temperature to about 75–175° C. to complete the reaction. Many variations in curing procedure are possible. The curing time varies with the starting materials and the curing temperature. In general, a reaction period of one to six hours at 75–175° C. is sufficient, using peroxide catalysts that decompose in this temperature range. Longer periods are normally required for complete cure at temperatures approaching room temperature, and temperatures above about 200° C. may be used in the final stages of cure.

The products of this invention are especially useful in such applications as the potting and encapsulating of electronic assemblies, and other casting and laminating applications benefitting from their enhanced flow and wetting properties and decreased viscosity. These products are also useful protective coatings, and find many other applications, based on their superior mechanical and electrical properties and stability characteristics. They may be combined with glass fibers or other reinforcing agents, with plasticizers, flexibilizers, fillers, extenders, pigments and dyes, and many other materials, for specific applications.

Illustrated below are the preparation and properties of a number of types of epoxypolybutadienes useful in the practice of this invention. All parts are by weight unless otherwise indicated.

EPOXYPOLYBUTADIENE "A"

Butadiene was polymerized as follows: A dispersion of sodium in refined kerosene was prepared by agitating 100 parts of sodium, 100 parts of refined kerosene and one part of dimer acid for one hour at 105–110° C. in a homogenizer to produce sodium particles of 2–10 microns in size. About 4 parts of sodium as a 46% dispersion in kerosene and 88 parts of benzene were charged to an agitated reactor, the temperature was raised to 92° C., and 5.0 parts of technical grade butadiene was added to initiate the reaction. The temperature was maintained at about 90° C. while 36.0 parts of butadiene was added continually. The reaction was continued until the monomer was completely reacted, as indicated by a drop in pressure. The reactants were then cooled to 50° C., and glacial acetic acid was added to destroy the catalyst. The mixture was filtered through soda ash, and the filtrate was stripped of volatiles over a temperature range of 19–55° C. at 23–57 mm. Hg. The residue was an oily polybutadiene, having an iodine number of 320 and a melt viscosity of 42 poises at 25° C. and zero shear.

This polybutadiene was epoxidized as follows: About 400 parts of polybutadiene, 400 parts of toluene, 168 parts of Dowex resin 50X–8 (a sulfonated styrene-divinylbenzene copolymer cross-linked with 8% divinylbenzene) and 81 parts of glacial acetic acid were charged to an agitated flask. About 186 parts of 50% hydrogen peroxide was added slowly to the mixture. The temperature was maintained at 65° C. for 5.8 hours. The mixture was then cooled to 30° C., and filtered from the ion exchange resin. The solution was neutralized with sodium carbonate, and filtered to remove the sodium acetate. The filtrate was heated to 47° C. at 125 mm. Hg to remove the water azeotropically, and then stripped of toluene at 7 mm. Hg up to 85° C. The epoxypolybutadiene obtained as residue had an epoxy oxygen content of 5.2% by weight, iodine number of 201, and melt viscosity of 15,700 poises at 25° C. extrapolated to zero shear.

EPOXYPOLYBUTADIENE "B"

Butadiene was polymerized as follows: About 4.3 parts of sodium as a 46% dispersion in kerosene and 162 parts of benzene were charged to an agitated reactor, the temperature was raised to 90° C., and 3.0 parts of technical grade butadiene was added. The temperature was maintained at about 85° C. while 97 parts of butadiene and 20 parts of dioxane were added over a period of 3.5 hours. The reaction ingredients were then cooled to 50° C. and added to 19 parts of glacial acetic acid. The mixture was filtered through 21 parts of soda ash, and the filtrate was stripped of volatiles over a temperature range of 19–55° C. at 23–57 mm. Hg. The residue was a liquid polybutadiene, having an iodine number of 383, melt viscosity of 16.4 poises at 25° C. extrapolated to zero shear, and molecular weight of 980.

This polybutadiene was epoxidized as follows: About 100 parts of liquid polybutadiene, 100 parts of benzene, 41.6 parts of Dowex resin 50X–12 (a sulfonated styrene-divinylbenzene copolymer cross-linked with 12% divinylbenzene) and 16.2 parts of glacial acetic acid were heated with agitation to 60° C. About 70 parts of 50% hydrogen peroxide was then added, over a period of 3 hours. The temperature was maintained at 60° C. for an additional 2 hours, the mixture was cooled to 30° C., mixed with 123 parts of benzene and 26 parts of soda ash, and allowed to settle. The oily layer was separated and filtered. The filtrate was heated to 80° C. to remove the water azeotropically, and then stripped of benzene at 35° C. and 60 mm. Hg. The epoxypolybutadiene obtained as residue exhibited an iodine number of 176, an hydroxyl content of 1.6%, an epoxy oxygen content of 8.6% by weight and a melt viscosity of 980 poises extrapolated to zero shear at 25° C.

EPOXYPOLYBUTADIENE "C"

The polybutadiene prepared in "B" above was epoxidized as follows: About 100 parts of this polybutadiene, 100 parts of toluene, 41.6 parts of Dowex resin 50X–8 (a sulfonated styrene-divinylbenzene copolymer cross-linked with 8% divinylbenzene) and 16.2 parts of glacial acetic acid were charged to an agitated reaction flask, and heated to 60° C. About 70 parts of 50% hydrogen peroxide was added to the mixture over a period of 1.5 hours, at 60–70° C. Heating at 60–70° C. was continued for 15 hours, to increase the hydroxy content and thereby incerase the viscosity of the product. The mixture was then cooled to 25° C., filtered through fiber glass, and neutralized with about 25 parts of sodium carbonate. The oily layer was separated, and water was removed by azeotropic distillation with 125 parts of benzene, followed by removal of volatiles at 35° C. and 60 mm. Hg. The epoxypolybutadiene residue had an epoxy oxygen content of 9.3% by weight, an hydroxy content of 4.1%, an iodine number of 154 and a melt viscosity of 9000 poises at 25° C. extrapolated to zero shear.

EPOXYPOLYBUTADIENE "D"

The polybutadiene prepared in "A" above was epoxidized as follows: One hundred parts of this polybutadiene, 100 parts of toluene, 40 parts of Dowex resin 50X–8 (a sulfonated styrene-divinylbenzene copolymer cross-linked with 8% divinylbenzene), and 22 parts of glacial acetic acid were charged into an agitated flask. About 48 parts of 50% hydrogen peroxide was added to the mixture. The ingredients were allowed to react at 65° C. until essentially all of the peroxide was depleted. The batch was filtered through a cloth to remove the ion exchange resin, and a slurry of 20 parts of sodium carbonate in 100 parts of toluene and 75 parts of sodium sulfate were added to the filtrate. After allowing the inorganic cake to settle, the oil layer was separated by filtration. About 25 parts of magnesium sulfate was added to the filtrate to clarify the polymer solution, which was then filtered, and stripped of volatiles for eight hours at 80° C. and 29 mm. Hg. The epoxypolybutadiene obtained as residue had an epoxy oxygen content of 6.7% by weight, iodine number of 230 and viscosity of about 16,000 poises at 25° C. extrapolated to zero shear.

EPOXYPOLYBUTADIENE "E"

The polybutadiene prepared in "A" above was epoxidized as follows: About 600 parts of this polybutadiene, 600 parts of benzene, 60 parts of Dowex resin 50X–8 (a sulfonated styrene-divinylbenzene copolymer cross-linked with 8% divinylbenzene), and 23.3 parts of glacial acetic acid were mixed in a reactor. About 100 parts of 50% hydrogen peroxide was added slowly to the mixture at 61° C. over a period of 38 minutes. The ingredients were allowed to react for a total of about four hours. The mixture was filtered through fiber glass to remove the ion exchange resin and washed with an equal volume of water. After separation of the water, the acetic acid was neutralized with sodium carbonate and the acetate was removed by filtration. The benzene-polymer solution was stripped to remove the solvent. The epoxypolybutadiene obtained as residue had an epoxy oxygen content of 2.2%, and a melt viscosity of 3000 poises at 25° C.

The following examples illustrate the curing of the typical epoxypolybutadienes described above. Mechanical and electrical properties of the specific products described in the examples were determined according to standard ASTM tests. All parts are by weight unless otherwise indicated.

*Example 1*

To 30 parts of epoxypolybutadiene "A" were added 1.3 parts of 2,3-butylene glycol and 8 parts of styrene. Solutions of 2.75 parts each of maleic anhydride and hexahydrophthalic anhydride and of 0.30 part each of 2,5-bis(tert.-butylperoxy) - 2,5 - dimethylhexane and dicumyl peroxide in 1.0 part styrene were added to the blend at room temperature. The blend was spread on 12 plies of 0.0085 inch thick long-shaft satin weave glass cloth having a vinyl silane finish, and cured for 3 minutes at 70° C., 9 minutes at 135° C. and 20 p.s.i., 5 minutes at 155° C. and 50 p.s.i., and 24 hours at 155° C. The product had a flexural strength of 56,900 p.s.i., elongation of 1.9% and flexural modulus of 3,260,000 p.s.i.

*Example 2*

To 30 parts of epoxypolybutadiene "B" at room temperature were added 9 parts of vinyl toluene, 1.53 parts of glycerol, 0.60 part divinyl benzene, 0.60 part of dicumyl peroxide, 0.60 part of 2,5-bis(tert.-butylperoxy)-2,5-dimethylhexane and 8.3 parts of citraconic anhydride. The ingredients were blended at room temperature and spread onto 12 plies of glass cloth. The mixture was evacuated for 15 minutes at room temperature. The laminate was then placed in a press at 150° C. and cured for 30 minutes with ⅛-inch shims, to produce a rigid structure. After a further cure of 5.5 hours 155° C., the laminate had a flexural strength of 56,200 p.s.i., elongation of 2.2% and flexural modulus of 2,670,000 p.s.i.

*Example 3*

To 100 parts of epoxypolybutadiene "C" were added 11.3 parts of propylene glycol and 28 parts of styrene. The mixture was warmed to 35° C. and 54.9 parts of maleic anhydride at 60° C. was added. After cooling the mixture to room temperature, a solution of 0.2 part di-tertiary butyl peroxide in 2 parts of styrene was added. After a cure cycle of one hour at room temperature, 2.8 hours at 40° C., one hour at 60° C. and 2 hours at 115° C., the casting exhibited a flexural strength of 13,100 p.s.i., an elongation of 3.1% and a flexural modulus of 470,000 p.s.i.

*Example 4*

To 50 parts of epoxypolybutadiene "C" were added 4.9 parts of 2,3-butylene glycol, 1.0 part of divinylbenzene, and 14 parts of styrene. The mixture was warmed to 35° C. and 16.0 parts of maleic anhydride at 60° C. was added. After cooling to room temperature, a solution of 0.15 part benzoyl peroxide in one part of styrene was added. After a cure cycle of 2 hours at room temperature, 2 hours at 40° C., one hour at 70° C. and 4 hours at 115° C., the casting exhibited a flexural strength of 13,100 p.s.i., an elongation of 4.4% and a flexural modulus of 360,000 p.s.i.

*Example 5*

To 30 parts of epoxypolybutadiene "C" at 70° C. was added 0.03 part of boron trifluoride-monoethylamine at its melting point. After cooling to room temperature, 15.0 parts of styrene, 4.01 parts of glycerol, 11.97 parts of maleic anhydride mixed with 2.99 parts of methylendomethylenetetrahydrophthalic anhydride, and 0.30 part of benzoyl peroxide were added. The mixture was spread onto 12 plies of glass cloth. After two hours at room temperature, the laminate was rigid, and after 14 days at room temperature the laminate had a flexural strength of 32,900 p.s.i. and flexural modulus of 1,470,000 p.s.i. When postcured for two hours at 90° C., the laminate had a flexural strength of 50,500 p.s.i. and modulus of 2,850,000 p.s.i.

*Example 6*

To 30 parts of epoxypolybutadiene "C" at room temperature were added 9 parts of styrene, 3.01 parts glycerol, 0.3 part of methylethyl ketone peroxide, and 9.0 parts of maleic anhydride mixed with 2.2 parts of methylendomethylenetetrahydrophthalic anhydride. Then 0.1 part of cobalt naphthenate was added. The mixture was spread onto 12 plies of 0.0085 inch thick long-shaft satin weave glass cloth having a vinyl silane finish, and allowed to harden at room temperature. The laminate was rigid within two hours. After 15 days at room temperature, the flexural strength of the laminate was 29,100 p.s.i. A postcure of two hours at 90° C. raised the flexural strength to 42,100 p.s.i.

Repeating the above procedure, omitting the styrene from the formulation, provided a mixture which was not sufficiently fluid at room temperature to spread on the plies of glass cloth.

*Example 7*

Comparative experiments, omitting the styrene and peroxide, were conducted as follows: A blend containing equal parts of epoxypolybutadiene "B" and epoxypolybutadiene "C" was prepared, and found to have an average epoxy oxygen content of 9.0% by weight and a viscosity of 2600 poises extrapolated to zero shear at 25° C. To 50 parts of this blend were added 15 parts of styrene, 4.7 parts of 2,3-butylene glycol and 0.10 part of benzoyl peroxide. The mixture was warmed to 35° C. and 16.1 parts of maleic anhydride at 60° C. was added. The blend was poured into a mold and cured five hours at room temperature, two hours at 60° C. and 24 hours at 155° C. The casting had a heat distortion temperature of 130° C. at a deflection of 20 mils. After immersion for eight days in boiling water the heat distortion value at 20 mils deflection was 107° C.

Repeating the above experiment, omitting the styrene and benzoyl peroxide, produced a casting having an initial heat distortion temperature of 123° C. at 20 mils deflection, reduced to 64° C. after 8 days in boiling water.

*Example 8*

To 50 parts of the blend of epoxypolybutadiene "B" and "C" described in Example 7 were added 4.0 parts of propylene glycol and 4.0 parts of styrene. The mixture was warmed to 35° C. and 15.4 parts of maleic anhydride at 60° C. was added. After cooling to room temperature, 0.5 part of benzoyl peroxide in one part of styrene was introduced into the blend. After two hours at 50° C. and four hours at 115° C., the casting exhibited a flexural strength of 12,600 p.s.i., an elongation of 4.2% and a flexural modulus of 370,000 p.s.i.

*Example 9*

To 30 parts of the blend of epoxypolybutadiene "B" and "C" described in Example 7 were added 2.85 parts of 2,3-butylene glycol, 0.06 part of hydroquinone and eight parts of styrene. The mixture was warmed to 35° C. and 8.12 parts each of bicyclo-(2,2,1)-5-heptene-2,3-dicarboxylic anhydride and bicyclo-(2,2,1)-5-methyl-5-heptene-2,3-dicarboxylic anhydride were added. A solution of 0.15 part each of dicumyl peroxide and 2,5-bis(tert.-butylperoxy)-2,5-dimethylhexane in one part of styrene was added and spread on 12 plies of 0.0085 inch thick long-shaft satin weave glass cloth having a vinyl silane finish. The laminate was cured for three minutes at 70° C., 9 minutes at 135° C. and 25 p.s.i., 5 minutes at 155° C. and 50 p.s.i. and 5 hours at 155° C. The product exhibited a flexural strength of 57,800 p.s.i., elongation of 2.1% and flexural modulus of 2,480,000 p.s.i. After the laminate had been submerged in boiling water for eight days, the values were 39,000 p.s.i. flexural strength, 1.9% elongation and 2,180,000 p.s.i. flexural modulus.

*Example 10*

To 100 parts of the blend of epoxypolybutadiene "B" and "C" described in Example 7 were added, at room temperature, 30 parts of styrene, 0.05 part of hydroquinone, 9.4 parts of 2,3-butylene glycol, 0.60 part of dicumyl peroxide and 32.2 parts of molten maleic anhydride. The mixture was poured into a mold and cured for two hours at 60° C. and 24 hours at 155° C. The heat distortion temperatures at 10, 20 and 40 mils deflection were, respectively, 110°, 188° and over 200° C.

*Example 11*

To 30 parts of epoxypolybutadiene "D" were added 1.8 parts of 2,3-butylene glycol, 9.0 parts of styrene, 8.3 parts each of maleic anhydride and hexahydrophthalic anhydride, and 0.30 part each of dicumyl peroxide and 2,5-bis(tert.-butylperoxy)-2,5-dimethylhexane. The mixture was spread onto 12 plies of 0.0085 inch thick long-shaft satin weave glass cloth having a vinyl silane finish and cured over a cycle of three minutes at 70° C., nine minutes at 135° C. and 20 p.s.i., and 5 hours at 155° C. The laminate exhibited a flexural strength of 72,300 p.s.i. and flexural modulus of 3,640,000 p.s.i. After the laminate had been submerged in boiling water for eight days the values were flexural strength 39,600 p.s.i., and flexural modulus 2,999,000 p.s.i.

Example 12

To 30 parts of epoxypolybutadiene "D" at room temperature were added 2.2 parts of 2,3-butylene glycol, 16.7 parts of dimethylbutenyltetrahydrophthalic anhydride, 9.0 parts of vinyl toluene, 0.60 part of divinylbenzene and 0.45 part each of dicumyl peroxide and 2,5-bis(tert.-butylperoxy)-2,5-dimethylhexane. The blend was evacuated 15 minutes at room temperature and spread onto 12 plies of glass cloth. The laminate was molded 45 minutes at 150° C. with ⅛-inch shims, and cured for 24 hours at 155° C. The laminate had a flexural strength of 52,900 p.s.i. and flexural modulus of 2,250,000 p.s.i.

Example 13

To 30 parts of epoxypolybutadiene "E" were added 3 parts of vinyl toluene, 0.93 part of 2,3-butylene glycol, 0.6 part of divinyl benzene, 0.30 part of dicumyl peroxide, 0.30 part of 2,5-bis(tert.-butylperoxy)-2,5-dimethylhexane, 0.009 part hydroquinone and 3.0 parts of molten maleic anhydride. The mixture was spread onto 12 plies of glass cloth. After five minutes at 90° C. the laminate was pressed at 150° C. for 15 minutes using ⅛-inch shims. After 24 hours at 155° C., the laminate had a flexural strength of 30,300 p.s.i., elongation of 1.4% and flexural modulus of 2,130,000 p.s.i. Corresponding values for the laminate after an 8-day water-boil test were flexural strength of 33,400 p.s.i., elongation of 1.6% and flexural modulus of 2,240,000 p.s.i.

It is apparent that this invention is susceptible to numerous modifications within the scope of the disclosure, and it is intended to include such variations within the scope of the following claims.

We claim:

1. A curable resin composition comprising an epoxidized polybutadiene containing polymerizable double bonds and 1 to 15% by weight of epoxy oxygen; about 0.5 to 4 equivalents per epoxy oxygen of, in combination, an aliphatic polyhydric alcohol, and a dicarboxylic anhydride containing a polymerizable double bond, said equivalents of alcohol and anhydride being calculated on the basis that one epoxy oxygen atom is equivalent to one hydroxyl and to one carboxyl group; 5 to 50 parts, per 100 parts of epoxidized polybutadiene, of a vinyl monomer of the formula

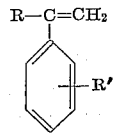

wherein R and R' are each selected from the group consisting of hydrogen and the methyl radical; and a catalytic amount of a free radical initiator.

2. The composition of claim 1, wherein said polyhydric alcohol is a lower alkylene glycol.
3. The composition of claim 1, wherein said polyhydric alcohol is glycerol.
4. The composition of claim 1, wherein said anhydirde is maleic anhydride.
5. The composition of claim 1, wherein said free radical initiator is an organic peroxide.
6. The composition of claim 5, wherein said organic peroxide decomposes at 75–175° C.
7. The composition of claim 1, wherein said vinyl monomer is styrene.
8. The composition of claim 1, wherein said vinyl monomer is alpha-methyl styrene.
9. The composition of claim 1, wherein said vinyl monomer is vinyl toluene.
10. A curable resin composition comprising an epoxidized polybutadiene containing polymerizable double bonds and 4% to 10% by weight of epoxy oxygen; about 1.5 to 2.5 equivalents per epoxy oxygen of, in combination, an aliphatic glycol having 2–6 carbon atoms and maleic anhydride, said equivalents of glycol and anhydride being calculated on the basis that one epoxy oxygen atom is equivalent to one hydroxyl and to one carboxyl group, said anhydride being present in excess equivalents over said glycol; 20 to 40 parts, per 100 parts of epoxidized polybutadiene, of styrene; and a catalytic amount of an organic peroxide.

11. The method of curing an epoxypolybutadiene resin containing polymerizable double bonds and 1 to 15% by weight of epoxy oxygen, which comprises reacting said epoxypolybutadiene with about 0.5 to 4 equavilents per epoxy oxygen of, in combination, an aliphatic polyhydric alcohol, and a polycarboxylic anhydride containing a polymerizable double bond, said equivalents of alcohol and anhydride being calculated on the basis that one epoxy oxygen atom is equivalent to one hydroxyl and to one carboxyl group; 5 to 50 parts, per 100 parts of epoxidized polybutadiene, of a vinyl monomer of the formula

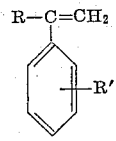

wherein R and R' are each selected from the group consisting of hydrogen and the methyl radical; and a catalytic amount of a free radical initiator.

12. The method of curing an epoxypolybutadiene resin containing polymerizable double bonds and 4% to 10% by weight of epoxy oxygen, which comprises reacting said epoxypolybutadiene with about 0.5 to 4 equivalents per epoxy oxygen of, in combination, an aliphatic glycol of 2–6 carbon atoms, and a dicarboxylic anhydride containing a polymerizable double bond, said equivalents of glycol and anhydride being calculated on the basis that one epoxy oxygen atom is equivalent to one hydroxyl and to one carboxyl group, said anhydride being present in excess equivalents over said glycol; 20 to 40 parts, per 100 parts of epoxidized polybutadiene, of styrene; and a catalytic amount of an organic peroxide.

13. The method of curing an epoxypolybutadiene resin containing polymerizable double bonds and 1% to 15% by weight of epoxy oxygen, which comprises reacting said epoxypolybutadiene with 1.25 to 2.5 equivalents per epoxy oxygen of, in combination, an aliphatic glycol having 2–6 carbon atoms and maleic anhydride, said equivalents of glycol and anhydride being calculated on the basis that one epoxy oxygen atom is equivalent to one hydroxyl and to one carboxyl group, said anhydride being present in excess equivalents over said glycol; 5 to 50 parts, per 100 parts of epoxidized polybutadiene, of styrene; and a catalytic amount of an organic peroxide.

14. A thermoset resin composition comprising the reaction product of an epoxidized polybutadiene containing polymerizable double bonds and 1% to 15% by weight of epoxy oxygen; about 0.5 to 4 equivalents per epoxy oxygen of, in combination, an aliphatic polyhydric alcohol, and a dicarboxylic anhydride containing a polymerizable double bond, said equivalents of polyol and anhydride being calculated on the basis that one epoxy oxygen atom is equivalent to one hydroxyl and to one carboxyl group, said anhydride being present in excess equivalents over said polyol; 5 to 50 parts of styrene and 0.02 to 0.5 parts of hydroquinone, per 100 parts of epoxidized polybutadiene; and a catalytic amount of a free radical initiator.

15. A thermoset resin composition comprising the reaction product of an epoxidized polybutadiene containing polymerizable double bonds and 4–10% by weight of epoxy oxygen; about 1.5 to 2.5 equivalents per epoxy oxygen of, in combination, an aliphatic glycol having about 2–6 carbon atoms and maleic anhydride, said equivalents of glycol and anhydride being calculated on the basis that one epoxy oxygen atom is equivalent to one hydroxyl and to one carboxyl group, said anhydride being present in excess equivalents over said glycol; 5 to 50 parts of styrene and 0.02 to 0.5 part of hydroquinone, per 100 parts of epoxidized polybutadiene; and a catalytic amount of an organic peroxide.

16. The method of curing an epoxypolybutadiene resin containing polymerizable double bonds and 1% to 15% by weight of epoxy oxygen which comprises combining said epoxypolybutadiene with 5 to 50 parts of styrene and 0.02 to 0.5 part of hydroquinone per 100 parts of epoxypolybutadiene, followed by addition of 0.5 to 4 equivalents per epoxy oxygen of, in combination, an aliphatic polyhydric alcohol and an unsaturated polycarboxylic anhydride, said equivalents of polyol and anhydride being calculated on the basis that one epoxy oxygen atom is equivalent to one hydroxyl and to one carboxyl group, said anhydride being present in excess equivalents over said polyol; and curing said combination under free radical polymerization conditions.

17. A curable composition comprising (a) an epoxidized polybutadiene, (b) an ethylenically unsaturated dicarboxylic acid anhydride, (c) an aliphatic polyhydric alcohol, and (d) styrene, said epoxidized polybutadiene containing at least 1% by weight oxirane oxygen, one epoxide equivalent of said epoxidized polybutadiene (a) being present for each equivalent of the total of (b) plus (c), the amount of styrene being up to about 50 parts per 100 parts of epoxidized polybutadiene.

18. A curable composition comprising (a) an epoxidized polybutadiene, (b) an ethylenically unsaturated dicarboxylic acid anhydride, (c) an aliphatic polyhydric alcohol, and (d) a styrene compound selected from the group consisting of styrene and methyl-substituted styrene, said epoxidized polybutadiene containing at least 1% by weight of oxirane oxygen; at least 0.5 equivalent of the total reactive groups of (b) plus (c) present for each epoxide equivalent of said epoxidized polybutadiene (a); and the amount of said styrene compound being up to about 50 parts per 100 parts of epoxidized polybutadiene.

References Cited by the Examiner
UNITED STATES PATENTS

| | | | |
|---|---|---|---|
| 2,829,135 | 4/1958 | Greenspan et al. | 260—78.4 |
| 2,848,433 | 8/1958 | Eirich | 260—78.4 |
| 2,859,199 | 11/1958 | Parker | 260—861 |
| 2,921,921 | 1/1960 | Greenspan et al. | 260—830 |
| 2,947,717 | 8/1960 | Belanger et al. | 260—835 |

SAMUEL H. BLECH, *Primary Examiner.*

DANIEL ARNOLD, LEON J. BERCOVITZ, WILLIAM H. SHORT, MURRAY TILLMAN, *Examiners.*